Patented May 25, 1937

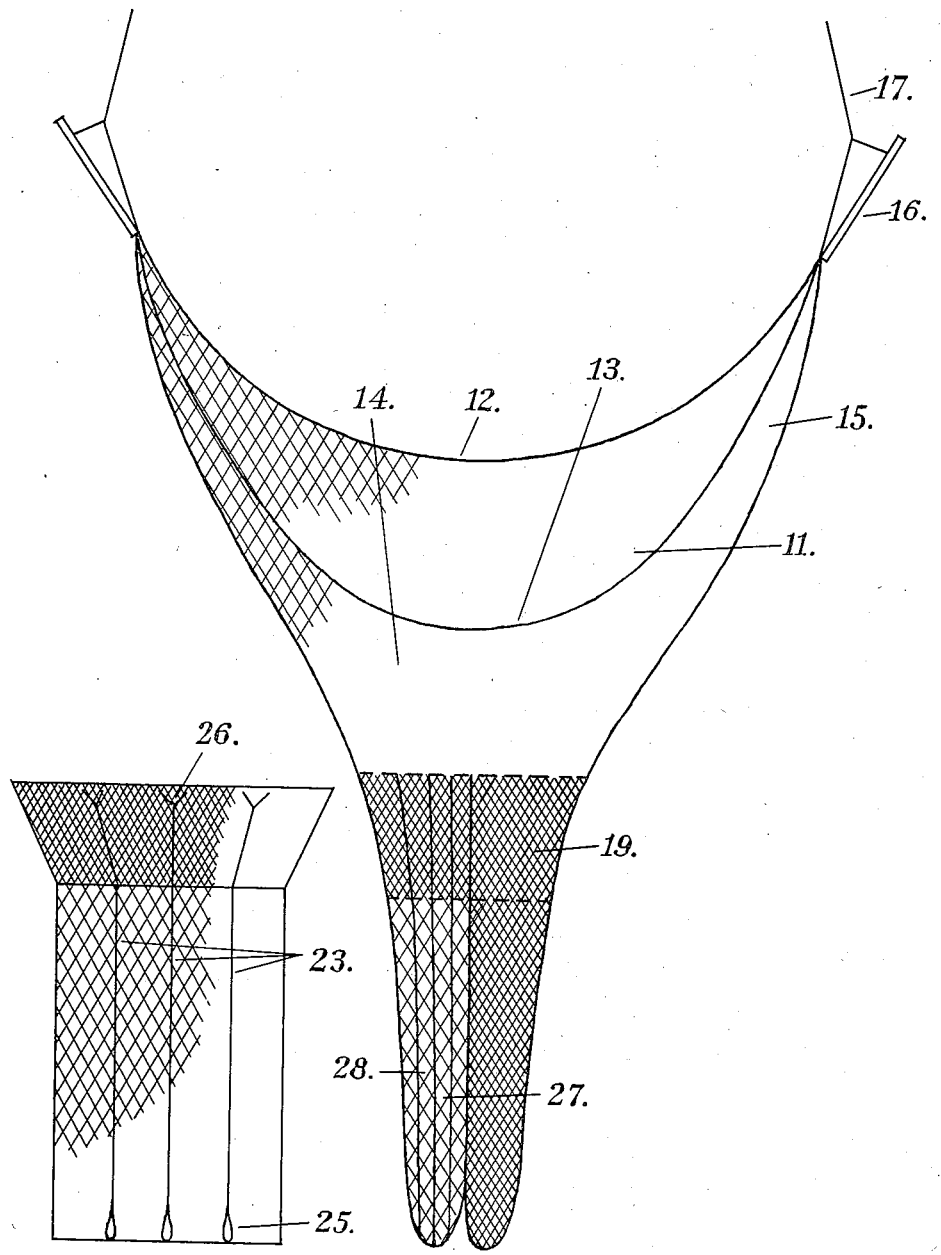

2,081,146

UNITED STATES PATENT OFFICE 2,081,146

TRAWL NET

William C. Herrington, Cambridge, Mass., assignor to the Government of the United States, as represented by the Secretary of Commerce Application February 20, 1933, Serial No. 657,659

15 Claims. (Cl. 43—9)

(Granted under the act of March 3, 1883, as amended April 30, 1928; 370 O. G. 757)

The invention described herein may be manufactured and used by or for the Government of the United States for governmental purposes only, without the payment of any royalty thereon.

My invention relates to trawl fishing nets and particularly to nets designed to permit the escape of small fish below the minimum marketable size.

As a result of my tests with trawl nets I have discovered that many small fish are caught in the cod ends of the usual forms of trawl nets and are prevented from escaping through the meshes thereof. This has been found to be due to the fact that as these meshes are too small and in addition become deformed (i. e., the lateral sides of the mesh are pulled together) under the stresses due to the towing of the cod-end and the catch imprisoned therein with a corresponding reduction in the effective sizes of the mesh.

I also found that when the size of the mesh of the entire cod end is materially increased beyond that in general use, (for example to the size of the mesh forming the upper portions of the main body of the net) that the bottom and end portions would lack sufficient strength and that dragging such a cod end over the sea bottom caused the bottom of the cod end to wear rapidly and become badly torn.

In seeking a means for overcoming this defect, I discovered that if the upper portion of my cod end were made of materially larger mesh than the bottom and end portions that undersized fish would make their escape through these larger mesh, and that the cod end would have sufficient strength to withstand the wear and stresses to which the bottom and end portions are subjected. Preferably the upper portion is made fuller than the corresponding section of the bottom and is preferably so attached to the taper and end portions that the bottom will relieve the large top mesh of some of the strain. When relieved of this strain these meshes retain their normal effective size, and the undersized fish are permitted to escape.

I also found that by reinforcing a cod-end of uniform mesh by means of a plurality of longitudinal stringers, that these stringers would materially reduce the deformation of the mesh, thus preventing a reduction in effective size below the required minimum, while also reducing the wear and tear on the bottom and end portions, whereby the undersized fish would be permitted to escape without making the bottom and end too weak.

I also discovered that by combining my novel form of cod end with reinforcing stringers that a still larger percentage of undersized fish would be discarded while still preventing the escape of marketable fish.

In the acompanying drawings—

Fig. 7 is a plan view of a cod end of large mesh webbing with attached reinforcing stringers.

Fig. 8 is a bottom view of a trawl net having a bifurcated cod end, one leg of the cod end being made of the standard small mesh webbing and a companion leg being made of reinforced large mesh webbing such as that illustrated in Fig. 7.

Figure 1:
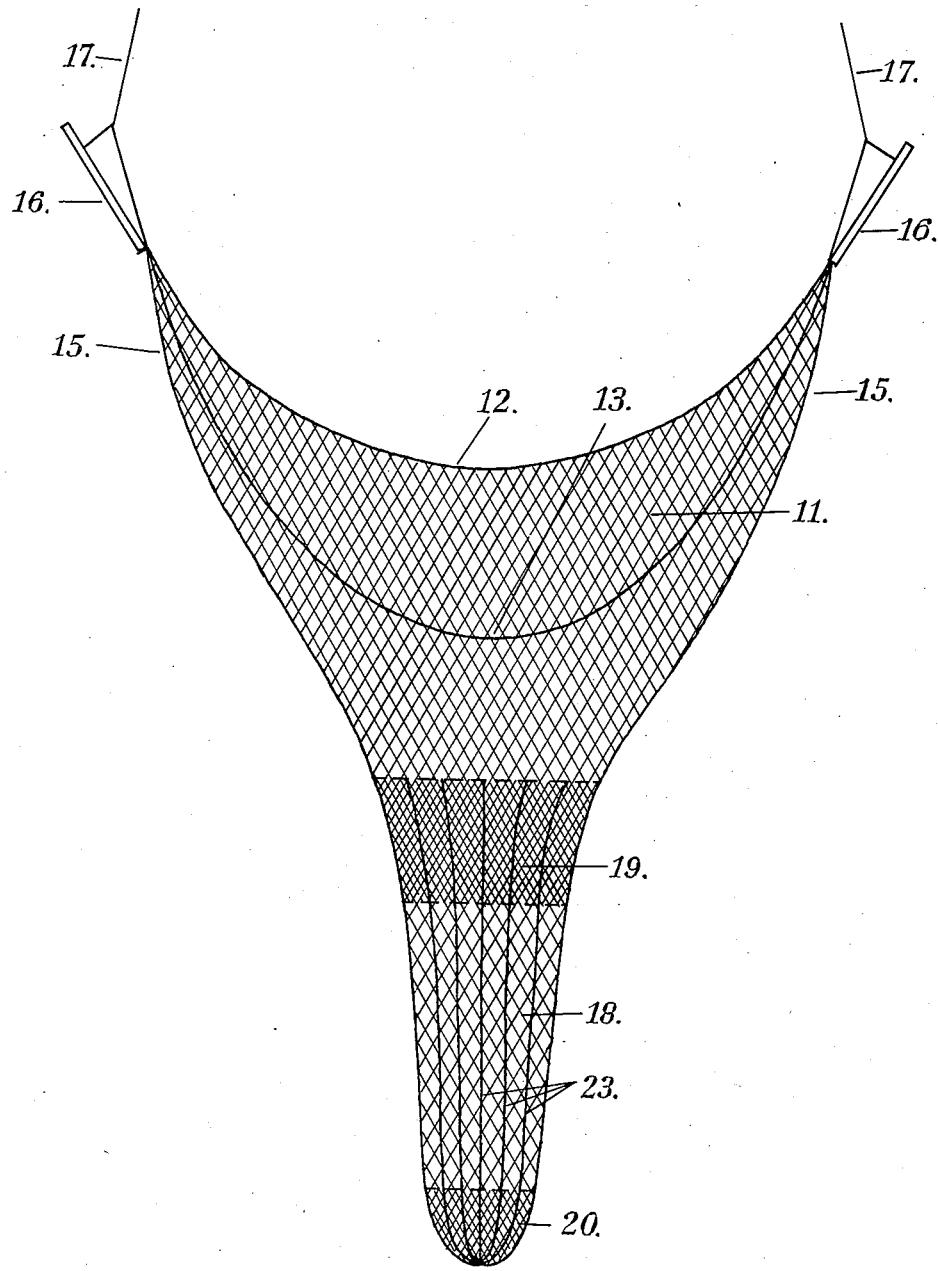
Fig. 1 is a plan view of one form of my trawl.

In these drawings 11 represents the main body of a trawl net, with a head rope 12, to which the upper portion of the net 11 is secured, and a foot-rope 13 which normally hangs below and in the rear of said head rope. A bottom portion 14 of the net is secured at its forward edge to the foot rope 13. The net is extended at each side by a side wing 15 secured between the head rope 12 and the foot rope 13. In advance of each side wing 15 is an otter board 16 which serves to keep the mouth of the net open as it is towed by means of a tow rope 17.

Figure 2:
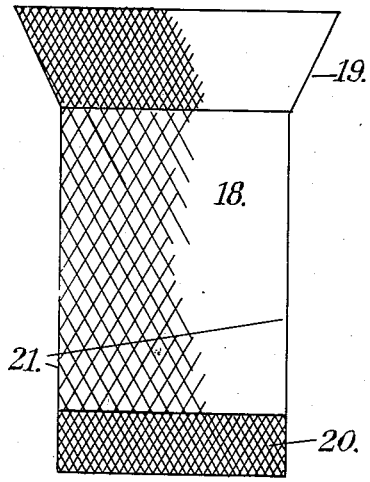
Fig. 2 is a plan view of the cod end of this trawl on a larger scale.
Figure 3:
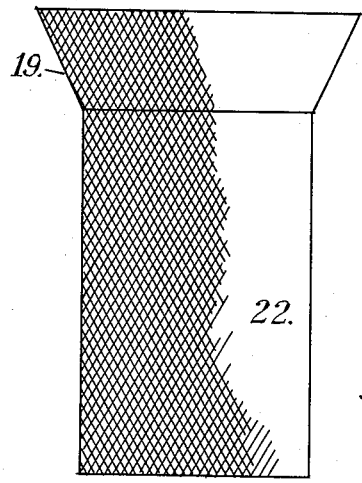
Fig. 3 is a similar view of the bottom portion of the cod end.

My savings piece 18 (Fig 2) is joined to the rear of a tapered portion 19 and to the forward edge of an end piece 20 and through a lace line 21 along each side to the bottom portion 22 (Fig. 3) of the cod end. I have obtained satisfactory results by making my savings piece 18 ten per cent longer than the corresponding part of the bottom piece, and of mesh which is approximately one and one-half times the size of the mesh in the taper portion 19, end piece 20, and bottom portion 22.

The mesh of main body, 11, of the net is made relatively large and of uniform size as far as the junction with the tapered portion forming a band 19 of finer mesh which when towed through the water tends to hold the mouth of the cod end open and to more evenly distribute the strains between the body and cod end.

As an alternative modification, the main body, 11, of the net may be made of relatively large mesh which, beginning at the junction with the band of finer mesh, 19, with a size approximately equal to that of the large meshed piece in my cod end, the mesh is increased gradually in size toward the forward part of the net to whatever size is desired by the user.

Figure 4:
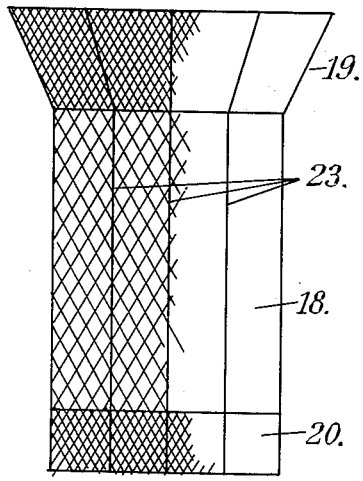
Fig. 4 is a plan view similar to Fig. 2 after my reinforcing rope stringers have been incorporated therein.
Figure 5:
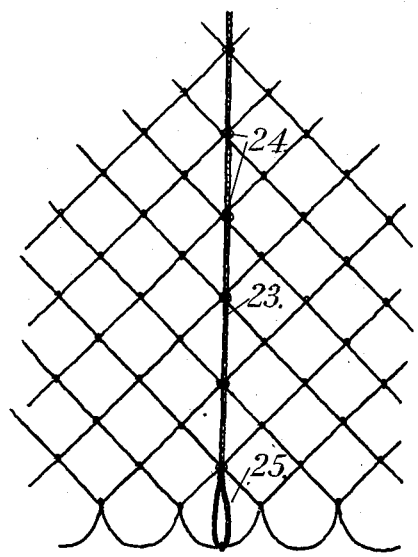
Fig. 5 is a detail of a portion of my cod end showing one method of securing one of my reinforcing stringers.
Figure 6:
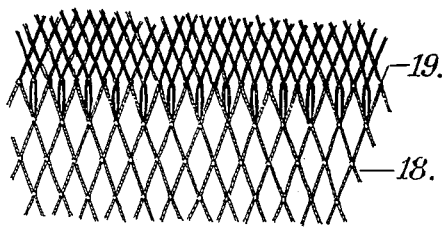
Fig. 6 is a detail of a portion of my net where my taper piece joins my savings piece.

In the modification illustrated in Figs. 4 and 5 a plurality of reinforcing stringers 23 have been secured to my savings piece 18 and extended into the taper piece 19 and the end piece 20, each stringer terminates in a loop 25 through which a cod-end rope may be threaded for closing the net during a haul. The netting is lashed as at 24, Fig. 5, to each stringer at each knot intersected by it with the mesh fully open, for example in diamond shape, as shown in the drawings, when the stringers 23 are pulled taut. Obviously the tensile strength and size of my stringers 23 should be ample to relieve my cod-ends of all or substantially all of the maximum strain to which they may be subjected while hauling the trawl net and also while hoisting the catch on board the fishing craft.

In the modification disclosed in Fig. 7, my cod end is formed of mesh which is of a size substantially uniform with that of the body of the net 11 which is much larger than that previously considered practical to use, to which my reinforcing stringers 23 have been attached preferably by lashing to the netting. Each of these stringers is formed with a terminal loop 25 for receiving a cod end rope, not shown, and is extended into the body of the net, preferably terminating in crow's-feet 26 lashed to the nettings either in the tapered portion 19 or in the body of the net 11 if desired.

The modification disclosed in Fig. 8 provides a means for testing the efficiency of my trawls, one leg 27 of a bifurcated cod end being made in accordance with my invention, the modification of Fig. 7 being illustrated, while the companion leg 28 is made with the commercial size of webbing in common use. With this form an accurate comparison may be made by counting the relative number of undersized fish retained in each leg of the cod end.

Obviously each of my modifications could be substituted for either of the legs of this cod end for the purpose of comparing the relative efficiency or both legs could be made according to one of my forms.

The size of mesh used in my savings piece 18 or in the modification shown in Fig. 7 may be varied according to the size of the fish which it is desired to retain in the net, and the weight of the twine should be adjusted to give the necessary strength with any given size of mesh. For the present market minimum size of one and one-half pounds for haddock and cod and for the large otter trawls, I have found that satisfactory results may be obtained with mesh for my savings piece 18 which when stretched measures four and one-half inches clear inside knots or five to five and a quarter inches between knot centers, when using "double four ply sixty (English)" twine or the equivalent. For the remainder of the cod end I have found that three to three and a half inch mesh (between knot centers) of "double four ply seventy five" twine or the equivalent, gives satisfactory results.

The smaller mesh used in the taper, end piece, and bottom of the cod-end gives extra strength where required but reduces the escapement area for the undersized fish very little, particularly when the bottom of the cod-end is covered by a heavy chafing gear. When the small mesh in the taper and end piece are fastened to my savings piece, two meshes to one of the savings piece, they help to hold the meshes in the latter open even when these small meshes are pulled together under strain. The ten per cent surplus length in the savings piece permits lateral expansion.

My cod end stringers serve to hold the mesh open particularly diamond shaped mesh, as shown in the drawings, to a greater extent, thus providing better opportunity for the escape of undersized fish; the strength of the cod-end is increased, and a part of the wear and abrasion is taken by these stringers, thus saving the netting to that extent. Better results may be obtained by first completely stretching a cod-end by the equivalent of landing ten or fifteen large hauls before my stringers are attached. The stringers may then be made somewhat shorter than the cod end when stretched so as to hold the meshes more fully open. This method may involve attaching my stringers while at sea during a trip but other means of stretching the cod-end may be used to enable the manufacturer to supply the finished net to the trawl fishermen.

The foregoing description comprehends only a general and preferred embodiment of my invention and changes in my net and method of making the same to suit the purpose for which it is to be used may be made within the scope of those claims which may be allowed, and therefore my claims are not intended as restricted to the specific details of my invention as disclosed herein.

While the primary object of my invention is the conservation of the supply of food fish by avoiding the wasteful killing of quantities of unmarketable sizes of valuable food fish it has other advantages, among which are some which should make a strong appeal to trawl fishermen, particularly those enumerated below.

First: As the small fish, "trash," small debris, and fish of marketable size pass from the larger forward portion of the trawl net into my improved cod ends, the small fish, "trash" and debris pass out through my savings portion or through my larger mesh supported by my reinforcing stringers, thus saving the cost in labor and time usually required to sort the marketable fish from the mass of unwanted small fish and small debris.

Second: The saving in time in sailing over a course in a fishing area with a given expenditure of power; or a corresponding saving in power if the towing speed is not increased.

Third: The original cost of the net is reduced, which saving may run as high as twenty per cent.

Fourth: Repairs to and replacement of nets are reduced due to a material reduction in the strains to which these nets are subjected while being towed, and when the catches are hoisted on board, thus saving both the time which may be lost and the cost of making replacements and repairs while on the fishing area.

Fifth: Repairs may be more quickly and easily made to my larger mesh than to the usual cod-ends.

Sixth: The sifting out of the undersized fish and debris leaves only the larger fish to be hauled in when landing the catch.

What I claim is:

1. In a net of the class described, the combination with a forwardly flaring portion of small sized mesh, a cod-end united with the smaller end of said flaring portion, having a savings portion of diamond mesh somewhat larger than its bottom and extreme end portions, and reinforcing stringers adapted to relieve said savings portion of stresses tending to reduce the effective size of the mesh of said savings portion.

2. A trawl net comprising a body of mesh and a cod end of mesh, the size of the meshes in the cod end being substantially uniform with those in the body, said cod end having ribs or stringers extending throughout its length and seized to the mesh thereof.

3. A trawl net comprising a body and a cod end formed of mesh, said cod end having ribs or stringers extending throughout its length and seized to the mesh thereof.

4. A trawl net comprising a body of mesh and a cod end of mesh, forming a continuation of said body, the size of the meshes in the cod end being uniform throughout, and substantially uniform with that in the body, means to maintain the mesh of said cod end in distended position, and means to close the rear of said cod end.

5. A trawl net comprising a body of mesh and a cod end of mesh forming a continuation of said body, the size of the meshes in the cod end being uniform throughout, and substantially uniform with that in the body, means to maintain the mouth of said cod end in distended position, and means to maintain the mesh of said cod end in distended position.

6. A trawl net having a body and a cod end, said cod end being constructed to facilitate escape of small objects therefrom and having a reinforcement effective to maintain said end in constantly distended position, said reinforcement being seized to the mesh of the net and unitary with said end.

7. A trawl net comprising a body of mesh, and a cod end of mesh, forming a continuation of said body, the size of the meshes in the cod end being substantially uniform with those in the body.

8. A trawl net comprising a body of mesh and a cod end of mesh, forming a continuation of said body, the size of the meshes in the cod end being uniform throughout, and substantially uniform with that in the body, means to maintain the mouth of said cod end in distended position, and means to close the rear of said cod end.

9. A trawl net comprising a body of mesh and a cod end of mesh, the size of the meshes in the cod end being substantially uniform with those in the smaller end of the main body, said cod end having ribs or stringers extending throughout its length.

10. A trawl net comprising a body of mesh, and a cod end of mesh, forming a continuation of said body, the size of the meshes in the cod end being substantially uniform with those in the smaller end of the main body.

11. A trawl net comprising a body of mesh and a cod end of mesh, forming a continuation of said body, the size of the meshes in the cod end being uniform throughout and substantially uniform with those in the smaller end of the main body, means to maintain the mouth of said cod end in distended position, and means to close the rear of said cod end.

12. A trawl net comprising a body and a cod-end of diamond-shaped mesh having a fish savings piece of diamond-shaped mesh on its upper side, which savings piece is greater in size and of meshes relatively larger than the adjacent portions of the cod-end to which the savings piece is attached, and wherein each individual larger diamond-shaped mesh of the savings piece spans and is knitted to a plurality of the finer bordering diamond-shaped meshes of the cod-end in such a ratio that the sum of the widths of the spanned finer meshes exceeds the width of the spanning larger mesh of the savings piece.

13. In a trawl net comprising a body and a cod-end of diamond-shaped mesh, a savings piece of diamond-shaped meshes in the upper portion of the cod-end having dimensions slightly less than a corresponding multiple of similar dimensions of the meshes of the bottom portion and end portions of the cod-end.

14. A net having a savings piece, the meshes of the net adjacent said savings piece having length and width dimensions such that a multiple of the said dimensions is slightly greater than similar dimensions of the meshes in the savings piece whereby the savings piece is maintained in distended position.

15. In a net of the class described the combination with a forwardly flaring portion of small sized mesh, a cod-end united with the smaller end of said flaring portion, said cod-end having a bottom and extreme end portion of small mesh and having an upper savings portion of somewhat larger mesh, and reinforcing stringers adapted to relieve said savings portion of stresses tending to reduce the effective size of the mesh of said savings portion.

WILLIAM C. HERRINGTON.